United States Patent
Mizumaki

(10) Patent No.: US 9,136,750 B2
(45) Date of Patent: Sep. 15, 2015

(54) MOTOR CAPABLE OF ADJUSTING PHASE DIFFERENCE BETWEEN OUTPUT SIGNALS

(75) Inventor: Masao Mizumaki, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 135 days.

(21) Appl. No.: 13/364,421

(22) Filed: Feb. 2, 2012

(65) Prior Publication Data

US 2012/0200180 A1    Aug. 9, 2012

(30) Foreign Application Priority Data

Feb. 4, 2011   (JP) ................................. 2011-022657

(51) Int. Cl.
*H02K 11/00*    (2006.01)
*H02K 37/14*    (2006.01)

(52) U.S. Cl.
CPC ............ *H02K 37/14* (2013.01); *H02K 11/0021* (2013.01)

(58) Field of Classification Search
CPC .................................................. H02K 11/0021
USPC .......................................... 310/49.01, 68 B
See application file for complete search history.

(56) References Cited

U.S. PATENT DOCUMENTS

| | | | | |
|---|---|---|---|---|
| 4,259,603 A * | 3/1981 | Uchiyama et al. | .......... | 310/68 B |
| 4,818,907 A * | 4/1989 | Shirotori | ..................... | 310/67 R |
| 6,208,061 B1 * | 3/2001 | An | ............................. | 310/254.1 |
| 6,751,842 B2 * | 6/2004 | Roesel et al. | .................. | 29/598 |
| 2004/0032807 A1 * | 2/2004 | Moriai | ....................... | 369/53.28 |
| 2009/0072677 A1 * | 3/2009 | Yasuda | ........................ | 310/68 B |
| 2012/0200180 A1 * | 8/2012 | Mizumaki | ................. | 310/49.01 |

FOREIGN PATENT DOCUMENTS

| | | |
|---|---|---|
| CN | 101257274 A | 9/2008 |
| JP | 61-262066 A | 11/1986 |
| JP | 05-137309 A | 6/1993 |
| JP | 08-033302 A | 2/1996 |
| JP | 3517548 B2 | 4/2004 |
| JP | 2005-512483 A | 4/2005 |
| JP | 2006-101602 A | 4/2006 |
| JP | 2008219959 A * | 9/2008 |

OTHER PUBLICATIONS

Machine Translation, JP 2008219959 A, Sep. 18, 2008.*
Machine Translation, Yasuda, JP 2008219959 A, Sep. 18, 2008.*
Japanese Office Action Issued in counterpart Japanese Patent Application 2011-022657 dated Jan. 29, 2013.
Chinese Office Action for corresponding CN 201210025530.2, mail date Dec. 30, 2013. English translation provided.

* cited by examiner

*Primary Examiner* — Thomas Truong
(74) *Attorney, Agent, or Firm* — Rossi, Kimms & McDowell LLP

(57) ABSTRACT

A motor capable of performing mechanical position adjustment of a magnetic detection unit to thereby adjust a phase difference between signals output from respective two magnetosensitive pole pieces. A rotor includes a magnet having an axial end surface magnetized to have circumferentially alternately different poles. A stator has two outer magnetic pole portions opposed to an outer peripheral surface of the magnet. Two coils are energized to excite the outer magnetic pole portions. A magnetic sensor is opposed to an axial end surface of the magnet. The magnetosensitive pole pieces of the magnetic sensor detect a magnetic field change caused by rotation of the magnet. The magnetosensitive pole pieces are arranged side by side in a direction orthogonal to a diametrical direction of the magnet. The position of the magnetic sensor can be adjusted in the diametrical direction of the magnet.

8 Claims, 10 Drawing Sheets

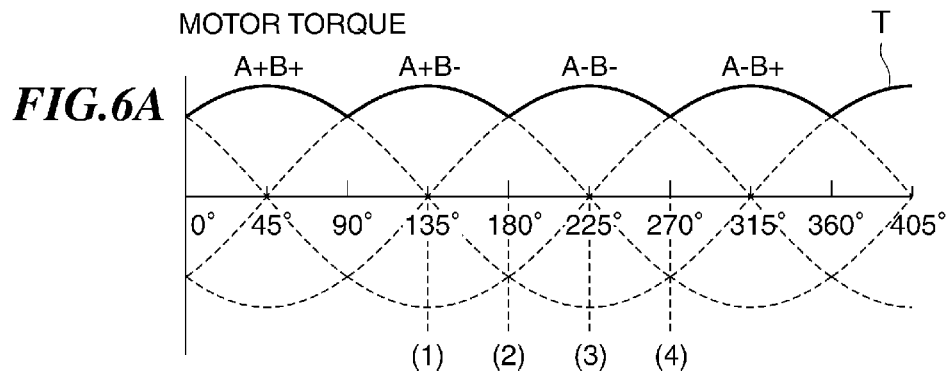
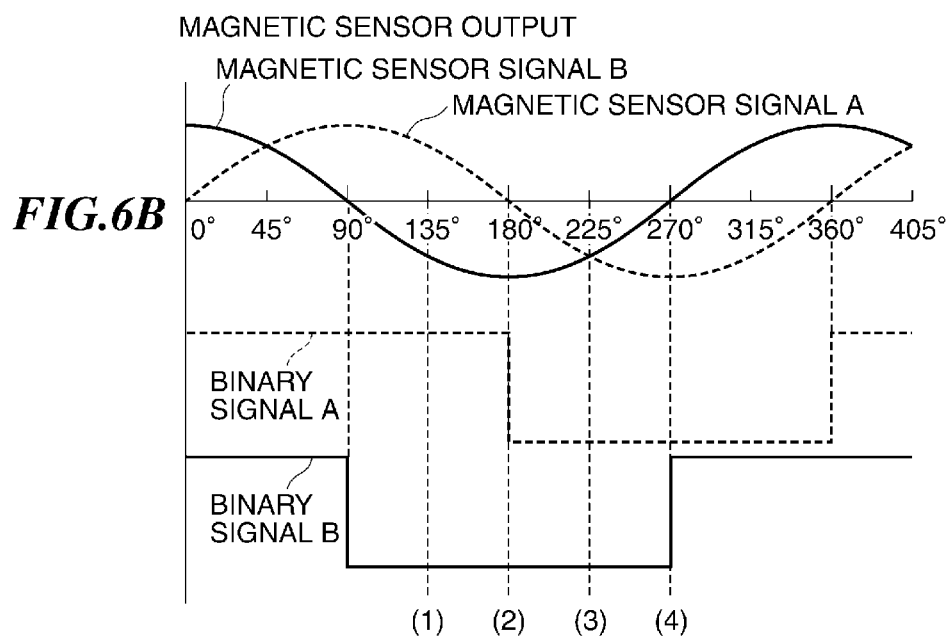

*FIG.8A*      *FIG.8B*
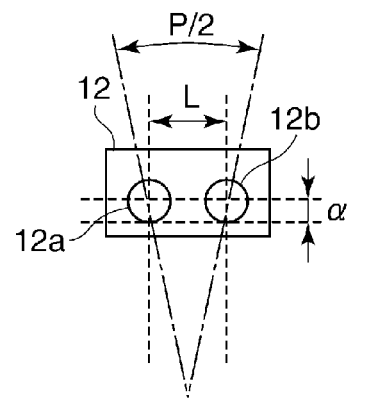
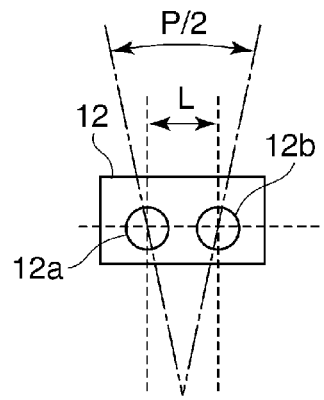
*FIG.9*
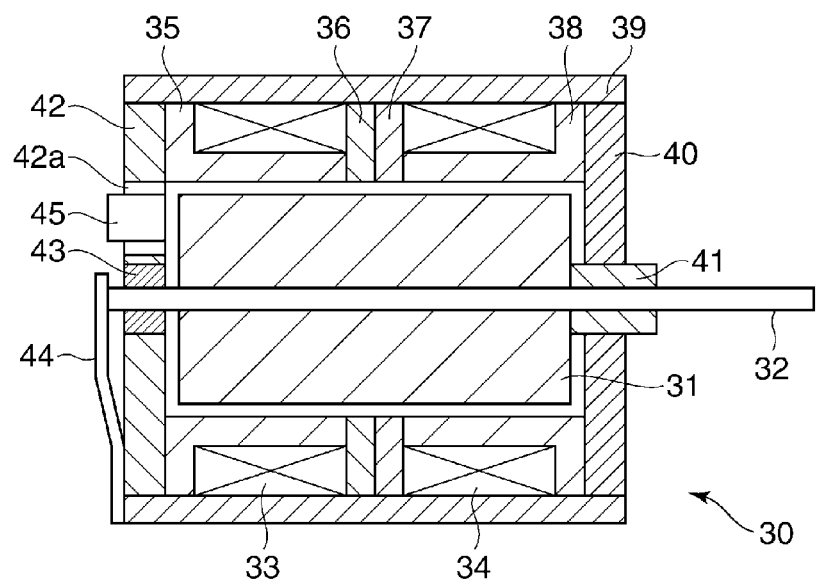

MOTOR CAPABLE OF ADJUSTING PHASE DIFFERENCE BETWEEN OUTPUT SIGNALS

BACKGROUND OF THE INVENTION

1. Field of the Invention

The present invention relates to a motor for rotating a rotor by switching the state of energization of coils, and more particularly to a motor provided with a position detecting unit for detecting a rotational position of a rotor.

2. Description of the Related Art

A stepper motor has a feature that it switches the state of energization of coils, whereby it is capable of rotating a rotor through an angle of rotation set for each step, and hence it is capable of easily performing position control even without a unit for detecting a rotational position of the rotor. For this reason, in driving the stepper motor, a drive mode is generally employed in which the state of energization of the coils is switched at predetermined time intervals by open-loop control.

However, in a case where the stepper motor is driven at a high speed or under a high-load condition, the rotor cannot respond to switching of the state of energization of the coils performed at the predetermined time intervals, which might cause a step-out of the motor.

To eliminate this fear, there has been proposed a stepper motor which is provided with a position detecting unit for detecting the rotational position of a rotor and has a drive mode in which high-speed drive can be achieved by execution of feedback control for switching the state of energization of coils according to an output from the position detecting unit. This type of stepper motor performs the feedback control based on rotor position information output from the position detecting unit, and therefore necessitates accurate rotor position information.

The above-mentioned type of stepper motor has been disclosed e.g. in Japanese Patent No. 03517548. In the stepper motor disclosed in Japanese Patent No. 03517548, an electric element is disposed between teeth of an outer yoke in opposed relation to the outer peripheral surface of a hollow cylindrical magnet which is magnetized in a circumferentially divided fashion, and the rotational position of the magnet (rotor) is detected by the electric element.

For detection of the rotational position of a magnet (rotor) magnetized in a circumferentially divided fashion as in the stepper motor disclosed in Japanese Patent No. 03517548, it is a common practice that a position detecting unit is circumferentially disposed in opposed relation to the magnet.

Further, a 2 phase driver stepper motor is generally provided with two position detecting units so as to facilitate rotational direction control. The two position detecting units are arranged side by side in the rotational direction of a magnet (rotor) such that they are opposed to the magnet surface in a manner shifted by ½ of a rotational angle corresponding to one pole (90 degrees in terms of electrical angle).

Based on rotor position information which is output from the two position detecting units to a motor controller, the motor controller switches the state of energization of coils according to the two phases of the stepper motor, whereby it is possible to perform feedback control of the 2 phase driver stepper motor.

If the two position detecting units are displaced in relative position from each other, it is difficult to accurately feed-back the rotor position information to the motor controller. As a solution to this problem, the two position detecting units (position detecting sensors) are provided in a single chip, and such single-chip position detecting sensor products are generally distributed on the market.

FIG. 12 is a view of a magnet and a position detecting sensor used in a stepper motor according to the related art.

FIG. 12 schematically shows only the magnet, denoted by reference numeral 101, and the position detecting sensor, denoted by reference numeral 102, as viewed axially from the stepper motor. The magnet 101 is formed into a hollow cylindrical shape, and is magnetized to have alternately different poles (a total of eight poles, i.e. four N poles and four S poles) in a circumferential direction thereof. The position detecting sensor 102 has a first sensor part 102a and a second sensor part 102b integrally formed in a single chip (package), and is disposed in opposed relation to the outer peripheral surface of the magnet 101.

When the first sensor part 102a of the position detecting sensor 102 is opposed to the boundary between an S pole and an N pole of the magnet 101, the second sensor part 102b is opposed to the center of the N pole of the magnet 101. The position detecting sensor 102 is thus disposed in a manner opposed to the magnet 101 such that an angle formed by the first sensor part 102a and the second sensor part 102b about the axis of a rotor rotating shaft becomes equal to ½ of a rotational angle corresponding to one pole (90 degrees in terms of electrical angle).

In short, signals output from the respective two position detecting units (the first and second sensor parts 102a and 102b of the position detecting sensor 102) are formed to have a phase difference of 90 degrees in terms of electrical angle. Therefore, by switching coil energization timing according to the positive or negative state of each of the signals, it is possible to obtain a high-efficiency stepper motor.

However, the position detecting sensor having two sensor parts built in a single chip as shown in FIG. 12 is on the market only in few types in respect of spacing between the two sensor parts. For this reason, when it is desired to obtain an appropriate spacing between the two sensor parts of the position detecting sensor and the magnetic poles of the stepper motor, it is only possible to select from the following two methods: a method of mechanically adjusting the distance between the position detecting sensor and the magnet which are opposed to each other, and a method of producing a special position detecting sensor in which spacing between the two sensor parts is customized.

However, in the case of the method of mechanically adjusting the distance between the position detecting sensor and the magnet which are opposed to each other, if the distance is adjusted by causing the position detecting sensor to get closer to the outer peripheral surface of the magnet, there is a fear of the position detecting sensor being brought into contact with the outer peripheral surface of the magnet. On the other hand, if the distance is adjusted by causing the position detecting sensor to get further from the outer peripheral surface of the magnet, the output from the position detecting sensor decreases, which results in an increased detection error due to lowered sensitivity of the position detecting sensor.

Further, the method of producing a special position detecting sensor in which spacing between the two sensor parts is customized is very costly. Especially, it is not practical under the constraints of costs to produce a position detection sensor customized in spacing between the two sensor portions each time a stepper motor is developed which is different in the number of poles and outer dimension of magnets.

A further alternative to the above, there is a method in which spacing between the two sensor parts is electrically adjusted as phase adjustment (electrical adjustment). However, when a mutual position error between the two sensor parts, an error in mounting of the package, and so forth are considered, it is necessary to perform the electrical adjustment on a stepper motor-by-stepper motor basis. The drive circuit is usually provided separately from the stepper motor. Therefore, it is required to perform electrical adjustment on a stepper motor-by-stepper motor basis to thereby determine an electrical adjustment value for each stepper motor, and then write the adjustment value in a drive circuit when the stepper motor is integrated into an apparatus.

SUMMARY OF THE INVENTION

The present invention provides a motor capable of performing the mechanical position adjustment of a magnetic detection unit and thereby adjusting a phase difference between signals output from respective two magnetosensitive pole pieces, while preventing a position detecting sensor from being brought into contact with the outer peripheral surface of a magnet or the sensitivity of the position detecting sensor from being degraded, differently from the related art.

The present invention provides a motor comprising a rotor configured to be rotatable about a shaft and including a magnet having an axial end surface magnetized to have alternately different poles in a circumferential direction thereof, a stator formed of a soft magnetic material and including magnetic pole portions opposed to an outer peripheral surface of the magnet, a plurality of coils configured to be energized to thereby excite the magnetic pole portions of the stator, a magnetic detection unit disposed in a manner opposed to the axial end surface of the magnet and having a first magnetosensitive pole piece and a second magnetosensitive pole piece for detecting a magnetic field change caused by rotation of the magnet, and a holding member configured to hold the magnetic detection unit in a manner opposed to the axial end surface of the magnet, wherein the holding member holds the magnetic detection unit such that the first and second magnetosensitive pole pieces of the magnetic detection unit are arranged side by side in a direction orthogonal to a diametrical direction of the magnet and such that a position where the magnetic detection unit is held can be adjusted in the diametrical direction of the magnet.

According to the present invention, the holding member holds the magnetic detection unit such that the first and second magnetosensitive pole pieces of the magnetic detection unit are arranged side by side in the direction orthogonal to the diametrical direction of the magnet and such that the position where the magnetic detection unit is held can be adjusted in the diametrical direction of the magnet. As a consequence, a motor can be provided which is capable of performing mechanical position adjustment of the magnetic detection unit and thereby adjusting a phase difference between signals output from the respective two magnetosensitive pole pieces.

Therefore, it is possible to solve the problem that the position detection sensor comes into contact with the outer peripheral surface of the magnet or the sensitivity of the position detection sensor is degraded, which is involved in the conventional method of mechanically adjusting the position of the position detection sensor with respect to the magnet. Further, it is possible to save time and labor for determining an electrical adjustment value for the motor and writing the value in the drive circuit, differently from the conventional method of electrically adjusting the position of the position detection sensor with respect to the magnet.

Further features of the present invention will become apparent from the following description of exemplary embodiments with reference to the attached drawings.

BRIEF DESCRIPTION OF THE DRAWINGS

FIG. 6A is a diagram showing the relationship between a rotor rotational angle and motor torque in the stepper motor, and FIG. 6B is a diagram showing the relationship between the rotor rotational angle and a magnetic sensor output in the stepper motor.

FIG. 8A is a view of the magnetic sensor of the stepper motor before position adjustment, and FIG. 8B is a view of the magnetic sensor of the stepper motor after position adjustment.

FIG. 9 is a cross-sectional view of a stepper motor according to a second embodiment of the present invention, taken along a plane extending through a rotor shaft of the stepper motor and parallel with the rotor shaft.

DESCRIPTION OF THE EMBODIMENTS

The present invention will now be described in detail below with reference to the accompanying drawings showing embodiments thereof.

First, a description will be given of a first embodiment of the present invention.

Figure 1:
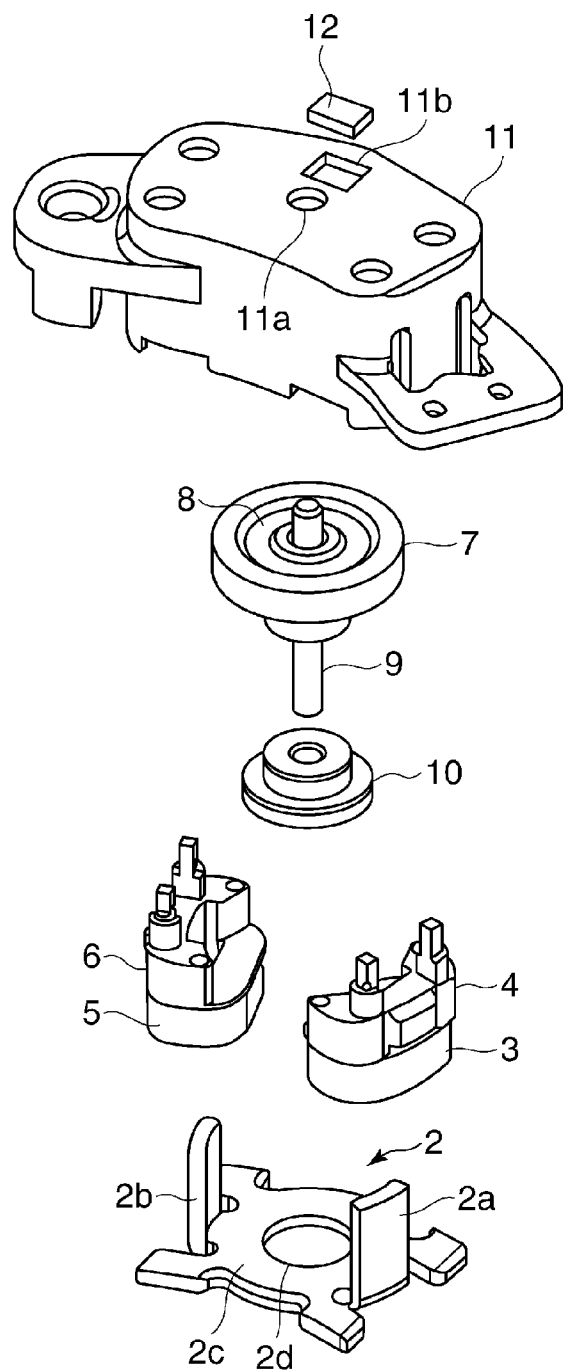
FIG. 1 is an exploded perspective view of a stepper motor according to a first embodiment of the present invention.
Figure 2:
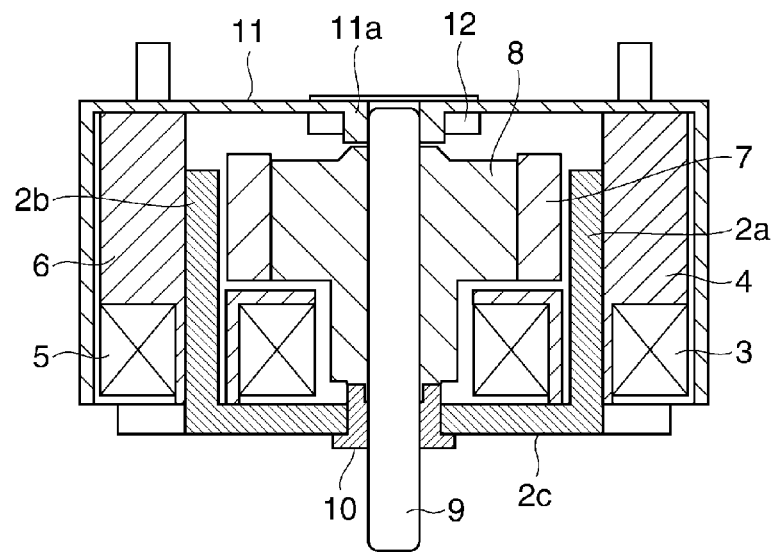
FIG. 2 is a cross-sectional view of the stepper motor, taken along a plane extending through coils and a rotor shaft of the stepper motor and parallel with the rotor shaft.
Figure 3:
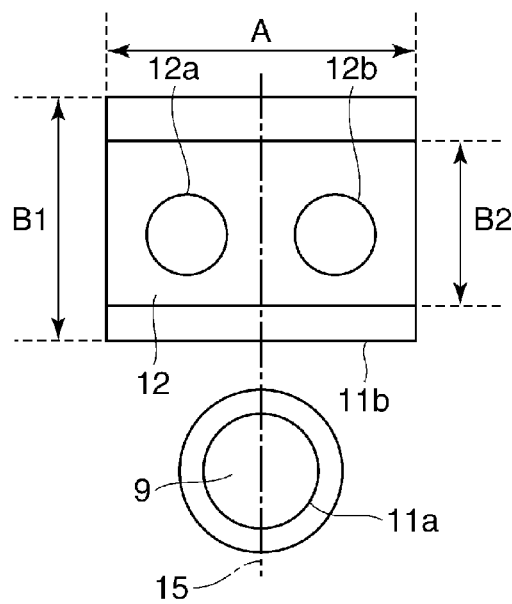
FIG. 3 is an enlarged view of a magnetic sensor of the stepper motor and a sensor mounting portion of a motor cover.

FIG. 1 is an exploded perspective view of a stepper motor according to the first embodiment. FIG. 2 is a cross-sectional view of the stepper motor, taken along a plane extending through coils and a rotor shaft of the stepper motor and parallel with the rotor shaft. FIG. 3 is an enlarged view of a magnetic sensor of the stepper motor and a sensor mounting portion of a motor cover.

As shown in FIGS. 1 to 3, the stepper motor comprises a stator 2, a first coil 3, a first bobbin 4, a second coil 5, a second bobbin 6, a magnet 7, a core 8, the rotor shaft, denoted by reference numeral 9, a bearing 10, the motor cover, denoted by reference numeral 11, and the magnetic sensor, denoted by reference numeral 12.

The stator 2 is formed of a soft magnetic material, and has a first outer magnetic pole portion 2a, a second outer magnetic pole portion 2b, a flat plate portion 2c connecting between one ends of the respective first and second outer magnetic pole portions 2a and 2b, and a bearing mounting portion 2d for having the bearing 10 mounted therein. Each of the first and second outer magnetic pole portions 2a and 2b of the stator 2 is formed into a comb tooth-like shape extending parallel with the rotor shaft 9.

The first coil 3 is fixed to the first bobbin 4 in a state wound around the same, such that the first outer magnetic pole portion 2a of the stator 2 is on the inner periphery side of the first bobbin 4 (see FIG. 2). When the first coil 3 is energized, the first outer magnetic pole portion 2a of the stator 2 is excited.

The second coil 5 is fixed to the second bobbin 6 in a state wound around the same, such that the second outer magnetic pole portion 2b of the stator 2 is on the inner periphery side of the second bobbin 6 (see FIG. 2). When the second coil 5 is energized, the second outer magnetic pole portion 2b of the stator 2 is excited.

The first coil 3 and the second coil 5 (a plurality of coils) are disposed adjacent to each other on the plane of the flat plate portion 2c with a portion of the core 8 and the rotor shaft 9 interposed therebetween. This makes it possible to reduce the axial length of the stepper motor.

The magnet (magnet ring) 7 is formed by a hollow cylindrical permanent magnet. The magnet 7 has an outer peripheral surface thereof circumferentially divided into a plurality of divisions (eight divisions in the present embodiment), and has the divisions alternately magnetized to S and N poles such that the number N of magnetic poles is equal to eight (N=8) (see FIG. 5).

The core 8 is formed of a soft magnetic material, and the hollow portion of the core 8 is rigidly fitted on the rotor shaft 9. The outer peripheral surface of an upper portion of the core 8 as viewed in FIG. 2 and the inner peripheral surface of the magnet 7 are rigidly fixed into intimate contact with each other, by bonding or insert molding (see FIG. 2).

The rotor shaft 9 is rotatably supported by the bearing 10 and a bearing portion 11a of the motor cover 11. A lower portion of the core 8 as viewed in FIG. 2 is disposed between the first coil 3 and the second coil 5 in a manner adjacent to these (see FIG. 2). The magnet 7, the core 8, and the rotor shaft 9 form a rotor.

The first and second outer magnetic pole portions 2a and 2b of the stator 2 are disposed in a manner opposed to the outer peripheral surface of the magnet 7 in a manner spaced therefrom by a predetermined clearance. A portion of the core 8 opposed to the first outer magnetic pole portion 2a of the stator 2 and a portion of the core 8 adjacent to the outer periphery of the first coil 3 form a first inner magnetic pole portion. Similarly, a portion of the core 8 opposed to the second outer magnetic pole portion 2b of the stator 2 and a portion of the core 8 adjacent to the outer periphery of the second coil 5 form a second inner magnetic pole portion. Since the rotor including the core 8 rotates, the first and second inner magnetic pole portions defined on the core 8 alternate its actual position on the core 8 according to rotation of the rotor.

When the first coil 3 is energized, the first outer magnetic pole portion 2a of the stator 2 and the first inner magnetic pole portion are excited. As a consequence, magnetic flux that crosses the magnet 7 is generated between the two poles and effectively acts on the magnet 7. In this case, the first outer magnetic pole portion 2a of the stator 2 and the first inner magnetic pole portion are excited to polarities opposite to each other.

Similarly, when the second coil 5 is energized, the second outer magnetic pole portion 2b of the stator 2 and the second inner magnetic pole portion are excited. As a consequence, magnetic flux that crosses the magnet 7 is generated between the two poles and effectively acts on the magnet 7. In this case, the second outer magnetic pole portion 2b of the stator 2 and the second inner magnetic pole portion are excited to polarities opposite to each other.

The bearing 10 is formed of a soft magnetic material, and is fixed to the bearing mounting portion 2d of the stator 2 e.g. by press-fitting. The bearing 10 is fitted on one axial end of the rotor shaft 9 to thereby support the rotor shaft 9 such that the rotor shaft 9 can rotate.

The motor cover 11 is formed with the bearing portion 11a and a sensor mounting portion 11b, and is fixed to the stator 2. The bearing portion 11a of the motor cover 11 is fitted on the other axial end of the rotor shaft 9 to thereby support the rotor shaft 9 such that the rotor shaft 9 can rotate. The sensor mounting portion 11b of the motor cover 11 holds the magnetic sensor 12. In other words, the motor cover 11 functions as a holding member.

In the state where the motor cover 11 is fixed to the stator 2, the rotor formed by the magnet 7, the core 8, and the rotor shaft 9 is rotatably supported by the motor cover 11 in a state disposed therein, and at the same time, the axial movement of the rotor is restricted within a predetermined range.

In this state, the predetermined clearance is formed between the outer peripheral surface of the magnet 7 of the rotor and the first and second outer magnetic pole portions 2a and 2b of the stator 2 (see FIG. 2). Further, a predetermined spacing is maintained between one axial end of the magnet 7 of the rotor and the inner surface of the motor cover 11, and a predetermined spacing is also maintained between the other axial end of the magnet 7 of the rotor and the first bobbin 4 having the first coil 3 wound therearound and the second bobbin 6 having the second coil 5 wound therearound.

In other words, the magnet 7 is disposed axially adjacent to the first coil 3 and the second coil 5. Further, the first coil 3 and the second coil 5 are disposed adjacent to each other on a plane orthogonal to the axial direction. This makes it possible to construct a stepper motor having a reduced axial length.

The magnetic sensor 12 is a non-contact magnetic detection unit for detecting magnetic flux from the magnet 7, and is configured e.g. as a Hall element. The magnetic sensor 12 has a first magnetosensitive pole piece 12a and a second magnetosensitive pole piece 12b in a single sensor (chip) (see FIG. 3). The first and second magnetosensitive pole pieces 12a and 12b of the magnetic sensor 12 detect a magnetic field change caused by rotation of the magnet 7.

The magnetic sensor 12 is provided with two output terminals associated with the first and second magnetosensitive pole pieces 12a and 12b, respectively. The magnetic sensor 12 outputs voltages each proportional to the density of a magnetic flux flowing through an associated one of the first and second magnetosensitive pole pieces 12a and 12b, via the output terminals, respectively. When a polarity corresponding to a direction of magnetic flux flowing through a magnetosensitive pole piece is N, a positive voltage is output from an associated output terminal, whereas when the polarity is S, a negative voltage is output from an associated output terminal.

The magnetic sensor 12 is fitted in the sensor mounting portion 11b of the motor cover 11 (see FIG. 1). Assuming that a direction in which the first and second magnetosensitive pole pieces 12a and 12b are arranged side by side is a longitudinal direction, the magnetic sensor 12 has a longitudinal length represented by A and a transverse length represented by B2 (see FIG. 3). The sensor mounting portion 11b of the motor cover 11 has a longitudinal length which is larger than A by a fitting tolerance, and a transverse length which is represented by B1. The transverse length B1 and the transverse length B2 are in the relationship of B1>B2.

With the above-described arrangement, the magnetic sensor 12 is allowed to move in the transverse direction as viewed in FIG. 3. A transverse center line 15 as a midpoint line between the first and second magnetosensitive pole pieces 12a and 12b of the magnetic sensor 12 extends through the center of the rotor shaft 9. More specifically, the transverse direction of the magnetic sensor 12 corresponds to a diametrical direction of the magnet 7 along a line extending from the center of the rotor shaft 9 through the center of the magnetic sensor 12, and the longitudinal direction of the magnetic sensor 12 corresponds to a direction orthogonal to the diametrical direction of the magnet 7 (see FIGS. 3 and 5).

The magnetic sensor 12 has its position adjusted in the transverse direction (i.e. in the diametrical direction of the magnet 7), and is then fixed to the sensor mounting portion 11b of the motor cover 11 e.g. by bonding. The method of adjusting the position of the magnetic sensor 12 will be described in detail hereinafter. The magnetic sensor 12 is disposed in a manner spaced from the axially upper end surface of the magnet 7 by a predetermined spacing (see FIG. 2).

The first and second outer magnetic pole portions 2a and 2b of the stator 2 are formed to have an axial length set such that the axially upper end surfaces of the respective outer magnetic poles become lower than that of the magnet 7 (see FIG. 2). More specifically, as shown in FIG. 2, the axially upper end surface of the magnet is protruded along the axial direction of the rotor shaft 9 such that it is closer to the magnetic sensor 12 than the respective end surfaces of the first and second outer magnetic pole portions 2a and 2b are.

With this arrangement, an attractive force is generated which acts on the magnet 7 in the axial direction of the rotor shaft 9 such that the magnet 7 is always pulled toward the bearing 10. More specifically, the distance between the axially upper end surface of the magnet 7 and the magnetic sensor 12 does not change even during rotation of the rotor. This makes it possible to obtain a stable output from the magnetic sensor 12.

Further, the magnetic sensor 12, which is disposed at a location spaced from the upper ends of the respective first and second outer magnetic pole portions 2a and 2b of the stator 2, is hard to be affected by magnetic flux generated when the first and second outer magnetic pole portions 2a and 2b are excited. Therefore, it is possible to obtain a stable output from the magnetic sensor 12.

Figure 4:
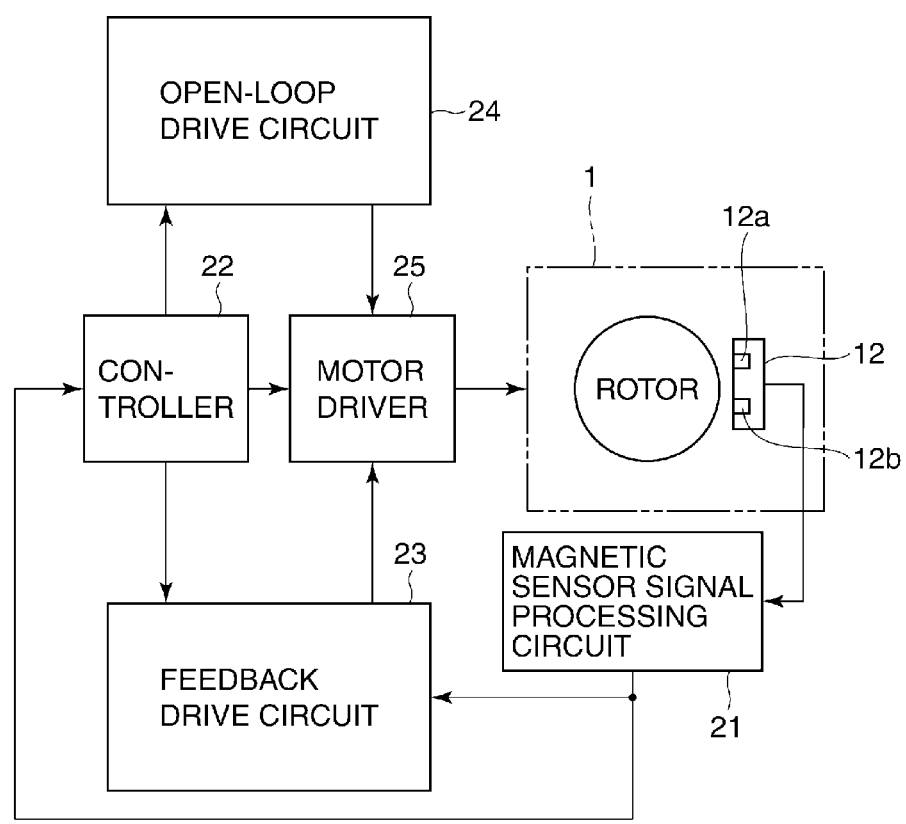
FIG. 4 is a block diagram of a control system of a motor driving device provided with the stepper motor.

FIG. 4 is a block diagram of a control system of a motor driving device provided with the stepper motor.

As shown in FIG. 4, the control system of the motor driving device comprises a magnetic sensor signal processing circuit 21, a controller 22, a feedback drive circuit 23, an open-loop drive circuit 24, and a motor driver 25.

The magnetic sensor signal processing circuit 21 processes an output from the magnetic sensor 12 of the stepper motor 1 having the construction described with reference to FIGS. 1 to 3. The controller 22 selects one of feedback control and open-loop control and executes the selected control.

The feedback drive circuit 22 generates a drive signal for driving the stepper motor 1 when the feedback control is selected by the controller 23. The open-loop drive circuit 24 generates a drive signal for driving the stepper motor 1 when the open-loop control is selected by the controller 22. The motor driver 25 drives the stepper motor 1 according to the drive signal output from the feedback drive circuit 23 or the open-loop drive circuit 24.

Next, a description will be given of open-loop drive of the stepper motor 1 by the motor driving device.

The open-loop drive of the stepper motor 1 can be performed using the open-loop drive circuit 24 and the motor driver 25. The open-loop drive mentioned here is identical to open-loop control for controlling a general stepper motor, and is performed based on a drive method in which the energization state of the first coil 3 and that of the second coil 5 are switched at predetermined time intervals.

More specifically, the open-loop drive circuit 24 and the motor driver 25 alternately switch the energization states of the first coil 3 and the second coil 5 according to an input drive pulse interval (drive frequency) and rotational direction. This makes it possible to rotate the rotor at a desired speed (speed control). Further, it is possible to rotate the rotor through a desired angle according to the number of input drive pulses (position control).

In the open-loop drive, the energization states of the first coil 3 and the second coil 5 are switched at predetermined time intervals (drive pulse intervals). Therefore, it is possible to control timing for switching the energization states of the first coil 3 and the second coil 5, without being affected by a result of detection by the magnetic sensor 12 that detects a magnetic field change caused by rotation of the magnet 7.

However, when the driving speed at which the stepper motor 1 is driven is increased (i.e. when the drive pulse intervals are reduced), the rotor becomes unable to respond to switching of the energization states of the first coil 3 and the second coil 5, which increases the possibility of occurrence of step-out of the motor. For this reason, it is required to adjust the drive pulse interval of pulses for driving the stepper motor 1, and hence the high-speed drive is limited.

Next, a description will be given of feedback drive of the stepper motor 1 by the motor driving device.

The feedback drive of the stepper motor 1 can be performed using the feedback drive circuit 23 and the motor driver 25. The feedback drive mentioned here is performed based on a drive method in which the energization states of the first coil 3 and the second coil 5 are switched according to an output from the magnetic sensor 12.

More specifically, the feedback drive circuit 23 and the motor driver 25 alternately switch the energization states of the first coil 3 and the second coil 5 according to a signal generated based on the number of input drive pulses and rotational direction and a detection signal output from the magnetic sensor 12. This makes it possible to rotate the rotor through a desired angle (position control). Further, by controlling electric current or voltage to be supplied to the first and second coils 3 and 5, it is possible to rotate the rotor with a desired torque (current/voltage control).

In the feedback drive, the energization states of the first coil 3 and the second coil 5 are switched according to an output from a position detecting element (magnetic sensor 12 in the present embodiment). Since the energization states of the first coil 3 and the second coil 5 are switched according to the position of the rotor, it is possible to suppress occurrence of step-out of the motor due to response delay of the rotor and achieve high-speed drive of the stepper motor 1.

Next, a description will be given of phase relationship between the stator 2 and the magnetic sensor 12 of the stepper motor 1.

Figure 5:
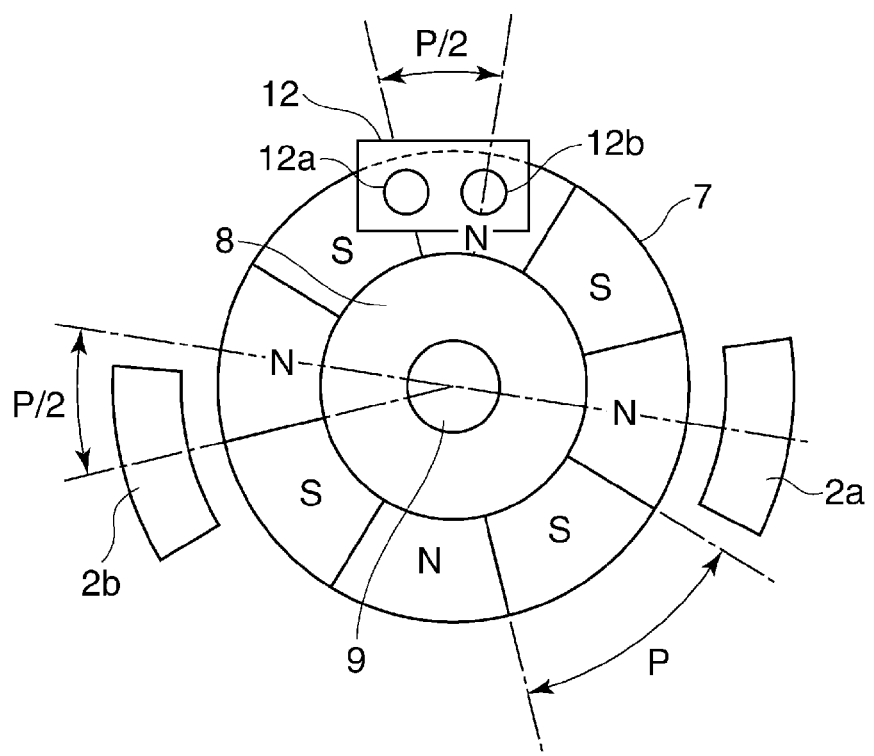
FIG. 5 is a bird's eye view, taken axially, which is useful in explaining the phase relationship between a stator and the magnetic sensor of the stepper motor.

FIG. 5 is a bird's eye view, taken axially, which is useful in explaining phase relationship between the stator 2 and the magnetic sensor 12 of the stepper motor 1.

For simplicity, FIG. 5 shows the positional relationship only between the first and second outer magnetic pole portions 2a and 2b of the stator 2, the magnet 7, the core 8, the rotor shaft 9, and the magnetic sensor 12. A clockwise direction as viewed in FIG. 5 is referred to as "the normal direction".

The magnetic sensor 12 is disposed in opposed relation to the axial end surface of the core 8 such that the first magnetosensitive pole piece 12a and the second magnetosensitive pole piece 12b are arranged side by side in the aforementioned direction orthogonal to the diametrical direction of the magnet 7 (see FIG. 2). Further, when viewed from the rotor shaft, the magnetic sensor 12 is disposed in a wider space (upper space as viewed from the rotor shaft 9 in FIG. 5) of two spaces (circumferential spaces) defined between the first outer magnetic pole portion 2a and the second outer magnetic pole portion 2b.

The magnetic sensor 12, which is disposed with spacing from the first and second outer magnetic pole portions 2a and 2b, is hard to be affected by magnetic flux generated when the first and second outer magnetic pole portions 2a and 2b are excited. Therefore, it is possible to obtain a stable output from the magnetic sensor 12.

In the present embodiment, the magnet 7 has eight poles, and a magnetization angle P is 45 degrees in terms of mechanical angle, as shown in FIG. 5. Further, with reference to the first outer magnetic pole portion 2a, the second outer magnetic pole portion 2b is opposed to the magnet 7 with a phase shift of P/2, i.e. a mechanical angle of −22.5 degrees.

When the first outer magnetic pole portion 2a is opposed to the center of an N pole of the magnet 7, the second outer magnetic pole portion 2b is opposed to the boundary between an S pole and an N pole of the magnet 7. At this time, the first magnetosensitive pole piece 12a of the magnetic sensor 12 is opposed to the boundary between an S pole and an N pole of the magnet 7, and the second magnetosensitive pole piece 12b of the magnetic sensor 12 is opposed to the center of the N pole of the magnet 7.

In the following, the operation of the stepper motor will be described using the electrical angle. The electrical angle is expressed on the assumption that one cycle of a magnetic force corresponds to an electrical angle of 360 degrees. Assuming that the number of the poles of the rotor is represented by M, and the actual angle (mechanical angle) of each pole is represented by $\theta_0$, the electrical angle $\theta$ can be expressed by the following equation (1):

$$\theta = \theta_0 \times M/2 \quad (1)$$

Each of the phase differences between the first outer magnetic pole portion 2a and the second outer magnetic pole portion 2b, between the first magnetosensitive pole piece 12a and the second magnetosensitive pole piece 12b, between the first outer magnetic pole portion 2a and the first magnetosensitive pole piece 12a, and between the second outer magnetic pole portion 2b and the second magnetosensitive pole piece 12b is equal to an electrical angle of 90 degrees.

Note that in FIG. 5, the center of the first outer magnetic pole portion 2a and that of an N pole as one division of the magnet 7 are opposed to each other, and this state is defined as a rotor initial state with an electrical angle of 0 degrees.

Next, a description will be given, with reference to FIGS. 6A and 6B, of the relationship between the rotor rotational position of the stepper motor and motor torque and the relationship between the rotor rotational position and the magnetic sensor output.

FIG. 6A is a diagram showing the relationship between the rotor rotational angle and the motor torque in the stepper motor, and FIG. 6B is a diagram showing the relationship between the rotor rotational angle and the magnetic sensor output in the stepper motor.

In FIG. 6A, the horizontal axis represents the electrical angle, and the vertical axis represents the stepper motor torque indicated by T. The stepper motor torque is taken as positive when it causes clockwise rotation of the rotor. Note that the FIG. 5 state corresponds to an electrical angle of 0 degrees. Rotor rotational positions indicated by (1), (2), (3), and (4) in FIG. 6A correspond to respective rotor rotational positions shown in FIGS. 7A, 7B, 7C, and 7D, respectively.

When an electric current in a normal direction is passed through the first coil 3 of the stepper motor, the first outer magnetic pole portion 2a of the stator 2 is excited i.e. magnetized to an N pole, whereby a magnetic force is generated between the first outer magnetic pole portion 2a and a magnetic pole of the magnet 7. Further, when an electric current in a normal direction is passed through the second coil 5 of the stepper motor, the second outer magnetic pole portion 2b of the stator 2 is excited i.e. magnetized to an N pole, whereby a magnetic force is generated between the second outer magnetic pole portion 2b and a magnetic pole of the magnet 7.

When the two magnetic forces generated in the magnet 7 are combined, torque is obtained which has a generally sine waveform (torque curve A+B+) in accordance with rotation of the rotor. Similarly, in other energization states as well, other types of torque each having a generally sine waveform are obtained (torque curves A+B−, A−B−, and A−B+). Since the first outer magnetic pole portion 2a of the stator 2 is disposed in a manner shifted in phase from the second outer magnetic pole portion 2b by an electrical angle of 90 degrees, adjacent ones of the four types of torque have a phase difference of 90 degrees in terms of electrical angle between them.

In FIG. 6B, the horizontal axis represents the electrical angle, and the vertical axis represents a magnetic sensor signal A and a magnetic sensor signal B output from the respective first and second magnetosensitive pole pieces 12a and 12b of the magnetic sensor 12 of the stepper motor.

The magnet 7 of the stepper motor is magnetized such that the strength of its magnetic force in the diametrical direction has a generally sine waveform with respect to the electrical angle. Therefore, a signal having a generally sine waveform (magnetic sensor signal A) is obtained from the magnetosensitive pole piece 12a of the stator 2. Note that in the present embodiment, the first magnetosensitive pole piece 12a outputs a positive value when opposed to an N pole of the magnet 7.

Further, the second magnetosensitive pole piece 12b of the magnetic sensor 12 is disposed in a manner shifted in phase from the first magnetosensitive pole piece 12a by an electrical angle of 90 degrees. Therefore, a signal having a generally cosine waveform (magnetic sensor signal B) is obtained from the second magnetosensitive pole piece 12b. Note that in the present embodiment, the second magnetosensitive pole piece 12b is reversed in polarity with respect to the first magnetosensitive pole piece 12a, and therefore it outputs a positive value when opposed to an S pole of the magnet 7.

Next, a description will be given of energization state switching in the feedback drive for driving the stepper motor.

In the feedback drive, the energization state of the first coil 3 is switched based on a binary signal A obtained by binarizing the magnetic sensor signal A in FIG. 6B, and the energization state of the second coil 5 is switched based on a binary signal B obtained by binarizing the magnetic sensor signal B in FIG. 6B.

More specifically, when the binary signal A is positive, the electric current in the normal direction is passed through the first coil 3, whereas when the binary signal A is negative, an electric current in a reverse direction is passed through the first coil 3. Further, when the binary signal B is positive, the electric current in the normal direction is passed through the second coil 5, whereas when the binary signal B is negative, an electric current in a reverse direction is passed through the second coil 5.

Figure 7A:
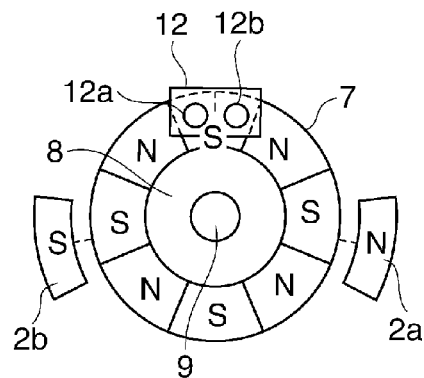
FIGS. 7A to 7D' are bird's eye views, taken axially, which are useful in explaining a feedback-driven operation of the stepper motor.
Figure 7B:
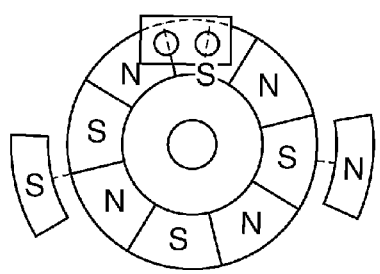
Figure 7B:
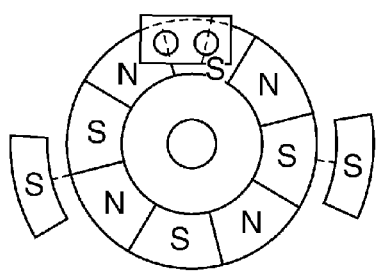

FIGS. 7A, 7B, 7B', 7C, 7D, and 7D' are bird's eye views, taken axially, which are useful in explaining a feedback-driven operation of the stepper motor.

As in FIG. 5, for simplicity, in FIGS. 7A to 7D', the positional relationship only between the first and second outer magnetic pole portions 2a and 2b of the stator 2, the magnet 7, the core 8, the rotor shaft 9, and the magnetic sensor 12 is shown. A clockwise direction as viewed in FIGS. 7A to 7D' is referred to as "the normal direction". As mentioned hereinabove, the rotor rotational positions shown in FIGS. 7A, 7B, 7C, and 7D correspond to those indicated by (1), (2), (3), and (4), respectively, in FIGS. 6A and 6B.

FIG. 7A shows a state where the rotor has been rotated through an electrical angle of 135 degrees from the FIG. 5 state. The binary signal A is positive, and the binary signal B is negative. The second magnetosensitive pole piece 12b of the magnetic sensor 12 has been reversed in polarity with respect to the first magnetosensitive pole piece 12a.

Therefore, the electric current in the normal direction flows through the first coil 3 of the stepper motor, and the first outer magnetic pole portion 2a of the stator 2 is magnetized to the N pole. On the other hand, the electric current in the reverse direction flows through the second coil 5, and the second outer magnetic pole portion 2b of the stator 2 is magnetized to an S pole. At this time, clockwise torque corresponding to the torque curve A+B− in FIG. 6A acts on the rotor to rotate the same in the clockwise direction.

FIG. 7B shows a state where the rotor has been rotated through an electrical angle of 180 degrees from the FIG. 5 state. The first magnetosensitive pole piece 12a of the magnetic sensor 12 is opposed to the boundary between an N pole and an S pole of the magnet 7. Therefore, the binary signal A changes from positive to negative when the rotor is rotated through 180 degrees in terms of electrical angle from the FIG. 5 state, whereby the direction of energization of the first coil 3 is switched from the normal direction to the reverse direction. This electrical angle corresponds to an electrical angle at an intersection between the torque curve A+B− and the torque curve A−B−.

FIG. 7B' shows a state where the rotor has been rotated through an electrical angle of 180 degrees from the FIG. 5 state and the energization direction of the first coil 3 has just been switched.

In this state, the electric current in the reverse direction flows through the first coil 3, and the first outer magnetic pole portion 2a of the stator 2 is magnetized to an S pole. Further, the electric current in the reverse direction flows through the second coil 5, and the second outer magnetic pole portion 2b is magnetized to the S pole. At this time, clockwise torque corresponding to the torque curve A−B− in FIG. 6A acts on the rotor to rotate the same in the clockwise direction.

Figure 7C:
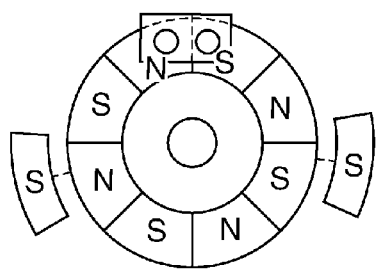

FIG. 7C shows a state where the rotor has been rotated through an electrical angle of 225 degrees from the FIG. 5 state. The magnetic sensor signals A and B assumes values as indicated by (3) in FIG. 6B, and the binary signals A and B are both negative.

In this state, the electric current in the reverse direction flows through the first coil 3, and the first outer magnetic pole portion 2a of the stator 2 is magnetized to the S pole. Further, the electric current in the reverse direction flows through the second coil 5, and the second outer magnetic pole portion 2b of the stator 2 is magnetized to the S pole. At this time, clockwise torque corresponding to the torque curve A−B− in FIG. 6A acts on the rotor to rotate the same in the clockwise direction.

Figure 7D:
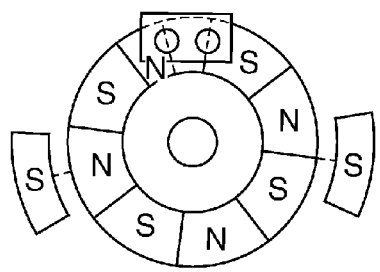
Figure 7D:
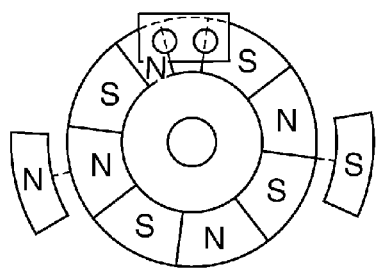

FIG. 7D shows a state where the rotor has been rotated through an electrical angle of 270 degrees from the FIG. 5 state. The second magnetosensitive pole piece 12b of the magnetic sensor 12 is opposed to the boundary between an N pole and an S pole of the magnet 7. Therefore, the binary signal B changes from negative to positive when the rotor is rotated through 270 degrees in terms of electrical angle from the FIG. 5 state, whereby the energization direction of the second coil 5 is switched from the reverse direction to the normal direction. This electrical angle corresponds to an electrical angle at an intersection of the torque curve A−B− and the torque curve A−B+.

FIG. 7D' shows a state where the rotor has been rotated through the electrical angle of 270 degrees from the FIG. 5 state and the energization direction of the second coil 5 has just been switched.

In this state, the electric current in the normal direction flows through the second coil 5, and the second outer magnetic pole portion 2b of the stator 2 is magnetized to the N pole. Further, the electric current in the reverse direction flows through the first coil 3, and the first outer magnetic pole portion 2a is magnetized to the S pole. At this time, clockwise torque corresponding to the torque curve A−B+ in FIG. 6A acts on the rotor to rotate the same in the clockwise direction.

By repeatedly carrying out the above-described operation, it is possible to cause continuous rotation of the rotor of the stepper motor. It is also possible to cause reverse rotation of the stepper motor by reversing the positive and negative values of the binary signals A and B, from the above.

Next, a description will be given of adjustment of the position of the magnetic sensor 12 of the stepper motor of the present embodiment.

The first and second magnetosensitive pole pieces 12a and 12b of the magnetic sensor 12 are desirably disposed closest possible to the magnet 7 so as to enhance the output of an magnetic sensor signal and reduce the influence of noise. In the present embodiment, the magnet sensor 12 is disposed with a spacing of approximately 0.5 mm from the axial end surface of the magnet 7 so as to be securely kept from contact with the magnet 7 (see FIG. 2).

The magnet 7 has the outer peripheral surface of its hollow cylindrical body circumferentially divided into a plurality of divisions (eight divisions in the present embodiment) and has the divisions magnetized, as described hereinabove. Consequently, the axial end surface of the magnet 7 is also circumferentially divided into a plurality of divisions which are magnetized. The axial end surface of the magnet 7 has a surface magnetic flux density slightly lower than that of the outer peripheral surface, but sufficient for detection by the magnetic sensor 12.

If the spacing between the first and second magnetosensitive pole pieces 12a and 12b of the magnetic sensor 12 is increased, the size of the magnetic sensor becomes large, which hinders size reduction of the stepper motor. To solve this problem, i.e. to avoid an increase in the size of the magnetic sensor, it is required to select an appropriate spacing between the two magnetosensitive pole pieces of the magnetic sensor. In commercially available magnetic sensors, the spacing between the two magnetosensitive pole pieces is limited to only a few types.

For this reason, even if it is desired to select a magnetic sensor having magnetosensitive pole pieces spaced appropriately according to the magnet diameter and the number of magnetic poles of a stepper motor, it is difficult to find a magnetic sensor that satisfies the selection conditions, and therefore mechanical position adjustment or electrical phase adjustment is required. In the present embodiment, mechanical position adjustment is performed.

FIG. 8A is a view of the magnetic sensor of the stepper motor before position adjustment, and FIG. 8B is a view of the magnetic sensor of the stepper motor after position adjustment.

As shown in FIGS. 8A and 8B, the magnetic sensor 12 is provided with the first magnetosensitive pole piece 12a and the second magnetosensitive pole piece 12b in the single sensor (chip), as described hereinabove, and the distance between the first magnetosensitive pole piece 12a and the second magnetosensitive pole piece 12b is set to L.

Before position adjustment, the phase between the first and second magnetosensitive pole pieces 12a and 12b of the magnetic sensor 12 is not always equal to P/2 (90 degrees in terms of electrical angle) due to dimensional tolerances of component parts and or mounting position error. Before position adjustment of the magnetic sensor 12, a position error α is caused between the spacing between the first and second magnetosensitive pole pieces 12a and 12b of the magnetic sensor 12 and the angle P/2 (see FIG. 5) of the magnet 7 (see FIG. 8A).

If the direction of coil energization is switched based on the magnetic sensor signals output from the magnetic sensor 12 in this state, a large torque change occurs during the energization switching, which causes degradation of output power of the stepper motor.

The magnet 7 has not only its outer peripheral surface but also its axial end surface circumferentially divided into the multiple divisions and has the divisions magnetized (see FIG. 5), so that when the magnetic sensor 12 is moved in the diametrical direction of the magnet 7, the phase difference between the first magnetosensitive pole piece 12a and the second magnetosensitive pole piece 12b changes.

In performing mechanical position adjustment of the magnetic sensor 12, the magnetic sensor 12 is moved in the diametrical direction of the magnet 7 while monitoring outputs from the first and second magnetosensitive pole pieces 12a and 12b of the magnetic sensor 12. Then, the magnetic sensor 12 is fixed to the motor cover 11 by bonding at a position where the phase difference between the first magnetosensitive pole piece 12a and the second magnetosensitive pole piece 12b becomes equal to an electrical angle of 90 degrees (see FIG. 8B). This completes the position adjustment of the magnetic sensor 12.

As described above, the position of the magnetic sensor 12 disposed with the predetermined spacing from the axial end surface of the magnet 7 is mechanically adjusted in the diametrical direction of the magnet 7, whereby it is possible to set the phase difference between the first magnetosensitive pole piece 12a and the second magnetosensitive pole piece 12b to 90 degrees in terms of electrical angle.

In other words, even in a case where a commercially available magnetic sensor in which the spacing between the first and second magnetosensitive pole pieces is predetermined is used instead of producing a magnetic sensor as a custom product, it is possible to perform mechanical position adjustment of the magnetic sensor to thereby properly adjust the position of the magnetic sensor such that output signals from the respective two magnetosensitive pole pieces have a phase difference of 90 degrees in terms of electrical angle.

This makes it possible to solve the problem that a position detection sensor comes into contact with the outer peripheral surface of a magnet or the sensitivity of the position detection sensor is degraded, which is involved in the conventional method of mechanically adjusting the position of the position detection sensor with respect to the magnet. Further, it is possible to save time and labor for determining an electrical adjustment value for a motor and writing the value in a drive circuit, differently from the conventional method of electrically adjusting the position of the position detection sensor with respect to the magnet.

Note that in the motor of the present invention, it is also possible to use two magnetic sensors each having a single magnetosensitive pole piece in an associated single sensor (chip), but it is desirable to use a magnetic sensor having two magnetosensitive pole pieces in a single sensor (chip). That is, the first magnetosensitive pole piece 12a and the second magnetosensitive pole piece 12b are desirably provided in a single chip. This makes it possible to suppress variation in characteristics of the two sensors (two magnetosensitive pole pieces).

Further, the spacing between the two magnetosensitive pole pieces can be determined as a dimension in a component part, and hence it is possible to obtain a stepper motor which is hard to be affected by a mounting error and is stable in quality. Furthermore, it is possible to reduce the number of component parts and wiring in comparison with the case where two magnetic sensors each having a single magnetosensitive pole piece in a single sensor is used, to thereby achieve reduction of the size of the entire stepper motor.

As described above, according to the present embodiment, since the magnetic sensor 12 is configured to be movable in a diametrical direction of the magnet 7 (position-adjustable), it is possible to adjust the phase difference between signals output from the respective first and second magnetosensitive pole pieces 12a and 12b provided in the single chip.

Therefore, even when a commercially available magnetic sensor is used instead of producing a special magnetic sensor in which the spacing between two sensor parts is customized, it is possible to perform mechanical position adjustment of the magnetic sensor to thereby properly adjust the position of the magnetic sensor such that output signals from the respective two magnetosensitive pole pieces have a phase difference of 90 degrees in terms of electrical angle.

Further, it is possible to determine the spacing between the first and second magnetosensitive pole pieces 12a and 12b of the magnetic sensor 12 as a dimension within a component, which facilitates mechanical position adjustment for causing output signals from the respective two magnetosensitive pole pieces to have a phase difference of 90 degrees in terms of electrical angle.

In the present embodiment, the first and second magnetosensitive pole pieces 12a and 12b of the magnetic sensor 12 are arranged side by side in the direction orthogonal to the diametrical direction of the magnet 7 such that the mechanical position adjustment of the magnetic sensor 12 can be performed in the diametrical direction of the magnet 7. This makes it possible to provide a stepper motor which is capable of performing mechanical position adjustment of the magnetic sensor 12 and thereby adjusting the phase difference between signals output from the respective two magnetosensitive pole pieces, while keeping the position detection sensor from contact with the outer peripheral surface of the magnet and preventing degradation of the sensitivity of the position detection sensor.

Next, a description will be given of a second embodiment of the present invention.

Figure 10:
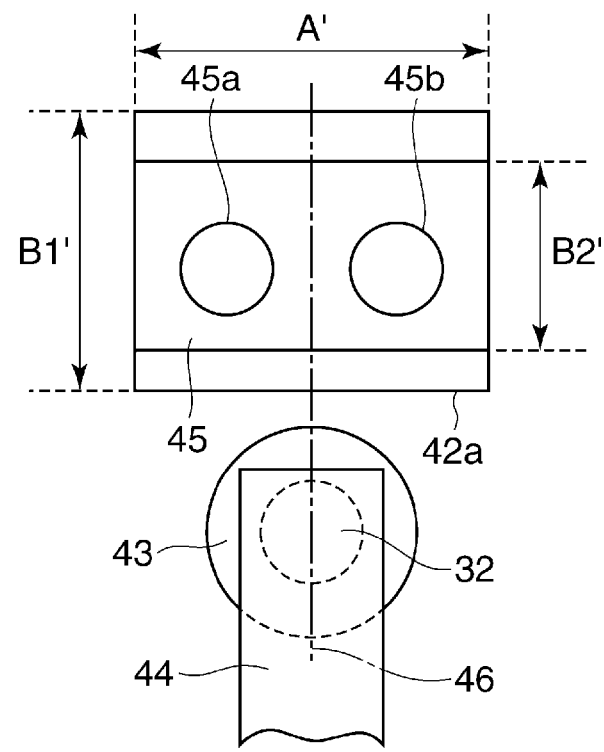
FIG. 10 is an enlarged view of a magnetic sensor of the stepper motor and a sensor mounting portion of a phase-B cover member.
Figure 11:
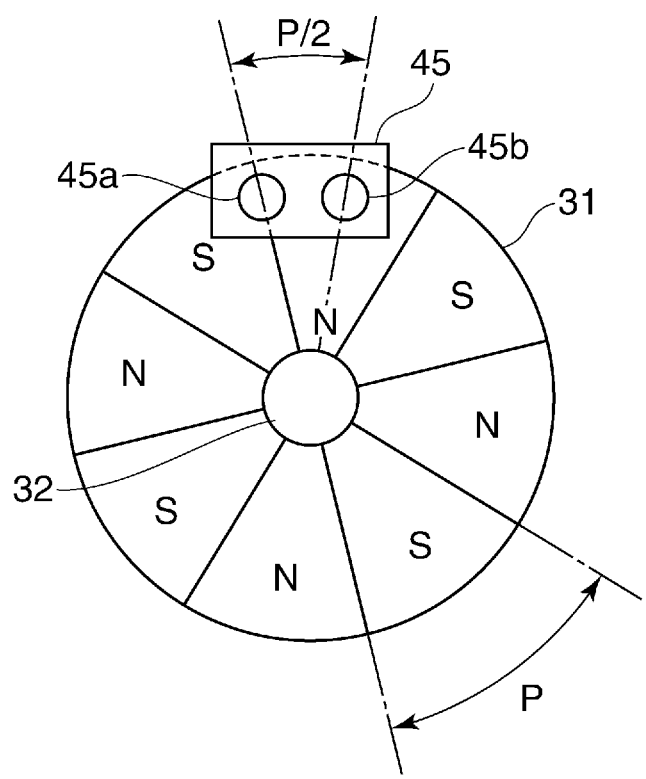
FIG. 11 is a bird's eye view, taken axially, which is useful in explaining the phase relationship between the magnetic sensor of the stepper motor and a magnet.
Figure 12:
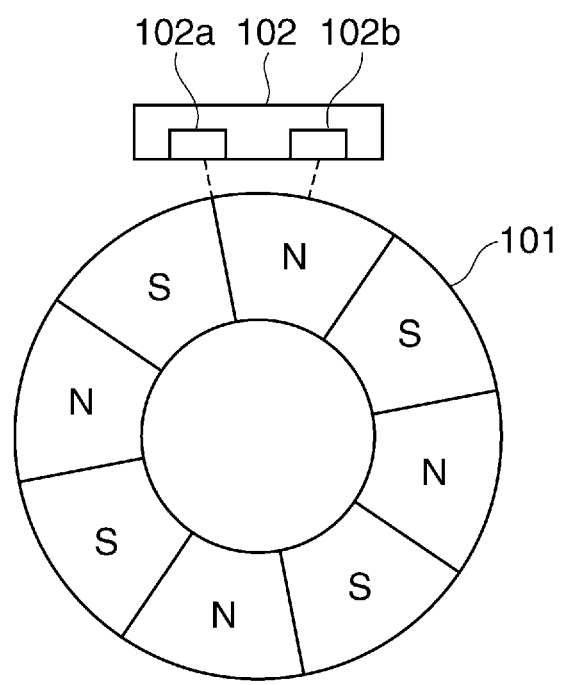
FIG. 12 is a view of a magnet and a position detecting sensor in a stepper motor according to the related art.

FIG. 9 is a cross-sectional view of a stepper motor according to the second embodiment, taken along a plane extending through a rotor shaft of the stepper motor and parallel with the rotor shaft. FIG. 10 is an enlarged view of a magnetic sensor of the stepper motor and a sensor mounting portion of a phase-B cover member. FIG. 11 is a bird's eye view, taken axially, which is useful in explaining the phase relationship between the magnetic sensor of the stepper motor and a magnet.

As shown in FIGS. 9 to 11, the stepper motor, denoted by reference numeral 30, includes the magnet 31, the rotor shaft, denoted by reference numeral 32, coils 33 and 34, stators 35, 36, 37, and 38, an outer cylindrical case 39, a phase-A cover member 40, the phase-B cover member, denoted by reference numeral 42, and the magnetic sensor, denoted by reference numeral 45.

The magnet 31 is formed into a cylindrical shape, and has an outer peripheral surface thereof circumferentially divided into a plurality of divisions and has the divisions magnetized. The rotor shaft 32 is rigidly fitted through the central portion of the magnet 31 by press-fitting or bonding. On the outer periphery side of the magnet 31, the two coils 33 and 34 are arranged in a manner spaced away from each other in the axial direction of the rotor shaft 32 and opposed to the outer peripheral surface of the magnet 31.

A pair of stators 35 and 36 are fixed to the coil 33 such that a predetermined phase angle is formed. Each of the stators 35 and 36 is formed of a soft magnetic material and has a magnetic pole tooth. The stators 35 and 36 form part of an excitation magnetic circuit.

A pair of stators 37 and 38 are fixed to the coil 34 such that a predetermined phase angle is formed. Each of the stators 37 and 38 is formed of a soft magnetic material and has a magnetic pole tooth. The stators 37 and 38 form part of the excitation magnetic circuit.

The coil 33 and the coil 34 are supported in the outer hollow cylindrical case 39 having an outer periphery formed of a soft magnetic material. The stators 35, 36, 37, and 38 and the outer hollow cylindrical case 39 surrounding the coils 33 and 34 define phase-A and phase-B excitation phases defined by respective two closed magnetic paths thereof. When the coil 33 is energized, the stators 35 and 36 are excited, and when the coil 34 is energized, the stators 37 and 38 are excited.

The phase-A cover member 40 is located at a phase-A side end of the stepper motor 30. The phase-A cover member 40 is supported in the outer hollow cylindrical case 39 in a fitted manner. In the central portion of the phase-A cover member 40 is rigidly fitted a phase-A bearing 41. The phase-A bearing 41 supports a phase-A side end of the rotor shaft 32 such that the rotor shaft 32 can rotate.

The magnet 31 has its axial end surface constantly held in contact with an axial end surface of the phase-A bearing 41 even during rotation of the magnet 31. This enables the magnet 31 to rotate stably without swinging in the axial direction.

The phase-B cover member 42 is located at a phase-B side end of the stepper motor 30. The phase-B cover member 42 is supported in the outer hollow cylindrical case 39 in a fitted manner. In the central portion of the phase-B cover member 42 is rigidly fitted a phase-B bearing 43. The phase-B bearing 43 supports the phase-B side end of the rotor shaft 32 such that the rotor shaft 32 can rotate. The magnetic sensor 45 is mounted in a sensor mounting portion 42a formed in the phase-B cover member 42. The phase-B cover member 42 is formed e.g. of a polycarbonate resin.

A leaf spring 44 is fixed to the phase-B cover member 42, for urging the rotor shaft 32 and the magnet 31 in the axial direction.

The magnetic sensor 45 is a non-contact magnetic detection unit for detecting magnetic flux from the magnet 31, and is configured e.g. as a Hall element. The magnetic sensor 45 has a first magnetosensitive pole piece 45a and a second magnetosensitive pole piece 45b built in a single sensor (chip). The first and second magnetosensitive pole pieces 45a and 45b of the magnetic sensor 45 detect a magnetic field change caused by rotation of the magnet 31.

The magnetic sensor 45 is provided with two output terminals associated with the respective first and second magnetosensitive pole pieces 45a and 45b. The magnetic sensor 45 outputs voltages proportional to respective densities of magnetic fluxes flowing through the first and second magnetosensitive pole pieces 45a and 45b, respectively, via respective associated ones of the output terminals. When a polarity of a magnetic flux flowing through a magnetosensitive pole piece is N, the magnetic sensor 45 outputs a positive voltage, whereas when the polarity is S, the magnetic sensor 45 outputs a negative voltage.

The magnetic sensor 45 is fixed in the sensor mounting portion 42a of the phase-B cover member 42. Assuming that a direction in which the first and second magnetosensitive pole pieces 45a and 45b are arranged side by side is a longitudinal direction, the magnetic sensor 45 has a longitudinal length represented by A' and a transverse length represented by B2' (see FIG. 10). The sensor mounting portion 42a of the phase-B cover member 42 has a longitudinal length which is larger than A' by a fitting tolerance and a vertical length which is represented by B1'. The vertical length B1 and the vertical length B2' are in the relationship of B1'>B2'.

With the above-described arrangement, the magnetic sensor 45 is allowed to move in the transverse direction. A transverse center line 46 as a midpoint line between the first and second magnetosensitive pole pieces 45a and 45b of the magnetic sensor 45 extends through the center of the rotor shaft 32. More specifically, the transverse direction of the magnetic sensor 45 corresponds to a diametrical direction of the magnet 31 along a line extending from the center of the rotor shaft 32 through the center of the magnetic sensor 45, and the longitudinal direction of the magnetic sensor 45 corresponds to a direction orthogonal to the diametrical direction of the magnet 31 (see FIGS. 10 and 11).

The magnetic sensor 45 has its position adjusted in the diametrical direction of the magnet 31, and is then fixed to the sensor mounting portion 42a of the phase-B cover member 42 e.g. by bonding. The method of adjusting the position of the magnetic sensor 45 will be described in detail hereinafter. The magnetic sensor 45 is disposed in a manner spaced from an axially end surface of the magnet 7 by a predetermined spacing (see FIG. 9).

The leaf spring 44 axially urges the rotor shaft 32 and the magnet 31, and the axial end surface of the magnet 31 is constantly held in contact with the axial end surface of the phase-A bearing 41 even during rotation of the magnet 31. Therefore, the distance between the axial end surface of the magnet 31 and the magnetic sensor 45 does not change even during rotation of the magnet 31. This makes it possible to obtain a stable output power from the magnetic sensor 45. The stepper motor 30 of the present embodiment is thus constructed.

As shown in FIG. 11, the first and second magnetosensitive pole pieces 45a and 45b of the magnetic sensor 45 are arranged side by side in the direction orthogonal to the diametrical direction of the magnet 31 in a manner opposed to the axial end surface of the magnet 31. In FIG. 11, for simplicity, the positional relationship only between the magnet 31, the rotor shaft 32, and the magnetic sensor 45 is shown.

In the present embodiment, the magnet 31 has eight poles, and a magnetization angle P is 45 degrees in terms of mechanical angle, as shown in FIG. 11. When the first magnetosensitive pole piece 45a of the magnetic sensor 45 is opposed to the boundary between an S pole and an N pole of the magnet 31, the second magnetosensitive pole piece 45b of the magnetic sensor 45 is opposed to the center of the N pole of the magnet 31. More specifically, the phase difference between the first and second magnetosensitive pole pieces 45a and 45b of the magnetic sensor 45 is equal to 90 degrees in terms of mechanical angle, from the above-mentioned equation (1):

$$\theta = \theta_0 \times M/2.$$

Next, a description will be given of position adjustment of the magnetic sensor 45 of the stepper motor 30 according to the present embodiment.

The phase difference between the first and second magnetosensitive pole pieces 45a and 45b of the magnetic sensor 45 is set to be 90 degrees in terms of electrical angle, but when tolerances of component parts and variation in mounting position are considered, it is difficult to make the phase difference equal to an electrical angle of 90 degrees without any mechanical adjustment, as in the above-described first embodiment.

The magnet 31 has the outer peripheral surface of its cylindrical body circumferentially divided into a plurality of divisions (eight divisions in the present embodiment) and has the divisions magnetized, as described hereinabove, and consequently, the axial end surface of the magnet 31 is also circumferentially divided into a plurality of divisions which are magnetized. The axial end surface of the magnet 31 has a surface magnetic flux density slightly lower than that of the outer peripheral surface, but sufficient for detection by the magnetic sensor 45.

The magnet 31 has its outer peripheral surface circumferentially divided and magnetized, and its axial end surface is circumferentially divided into the multiple divisions each expanding in fan shape from the inner periphery toward the outer periphery and magnetized as shown in FIG. 11. Therefore, when the magnetic sensor 45 is moved in the diametrical direction of the magnet 31, the phase difference between the first magnetosensitive pole piece 45a and the second magnetosensitive pole piece 45b changes.

In performing position adjustment of the magnetic sensor 45, the magnetic sensor 45 is moved in the diametrical direction of the magnet 31 while monitoring outputs from the first and second magnetosensitive pole pieces 45a and 45b of the magnetic sensor 45. Then, the magnetic sensor 45 is fixed to the phage-B cover member 42 by bonding at a position where the phase difference between the first magnetosensitive pole piece 45a and the second magnetosensitive pole piece 45b becomes equal to an electrical angle of 90 degrees. This completes the position adjustment of the magnetic sensor 12.

As described above, by adjusting the position of the magnetic sensor 45 in the diametrical direction of the magnet 7, it is possible to set the phase difference between the first magnetosensitive pole piece 45a and the second magnetosensitive pole piece 45b to 90 degrees in terms of electrical angle. In other words, even when a commercially available magnetic sensor is used instead of producing a special magnetic sensor in which the spacing between the two sensor parts is customized, it is possible to perform mechanical position adjustment of the magnetic sensor to thereby properly adjust the position of the magnetic sensor such that output signals from the respective two magnetosensitive pole pieces have a phase difference of 90 degrees in terms of electrical angle.

As described above, according to the present embodiment, the first and second magnetosensitive pole pieces 45a and 45b of the magnetic sensor 45 are arranged side by side in the direction orthogonal to the diametrical direction of the magnet 31 to thereby enable mechanical position adjustment of the magnetic sensor 45 to be performed in the diametrical direction of the magnet 31. This makes it possible to provide a stepper motor which is capable of performing mechanical position adjustment of the magnetic sensor 45 and thereby adjusting the phase difference between signals output from the respective two magnetosensitive pole pieces, while keeping the position detection sensor from contact with the outer peripheral surface of the magnet and preventing degradation of the sensitivity of the position detection sensor.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims priority from Japanese Patent Application No. 2011-022657 filed Feb. 4, 2011, which is hereby incorporated by reference herein in its entirety.

What is claimed is:

1. A motor comprising:
   a rotor configured to be rotatable about a shaft and including a magnet having an axial end surface and an outer peripheral surface, on each of which different poles are alternately arranged in a circumferential direction thereof;
   a stator formed of a soft magnetic material and including magnetic pole portions opposed to the outer peripheral surface of the magnet;
   a plurality of coils configured to be energized to thereby excite the magnetic pole portions of the stator;
   a magnetic detection unit which has a first magnetosensitive portion and a second magnetosensitive portion for detecting a magnetic field change caused by rotation of the magnet; and
   a holding member configured to hold the magnetic detection unit,
   wherein the holding member holds the magnetic detection unit such that the first magnetosensitive portion and the second magnetosensitive portion are opposed to the axial end surface of the magnet,
   wherein the holding member holds the magnetic detection unit such that a midpoint line between the first magnetosensitive portion and the second magnetosensitive portion of the magnet detection unit extends through a center of the shaft of the rotor,
   wherein the holding member holds the magnetic detection unit such that the magnetic detection unit is adjustable in a diametrical direction of the magnet without changing a space between the first magnetosensitive portion and the second magnetosensitive portion of the magnet detection unit,
   wherein the first magnetosensitive portion and the second magnetosensitive portion are provided in a single unit, and
   wherein the single unit is disposed in a single opening of the holding member.

2. The motor according to claim 1, wherein the axial end surface of the magnet is protruded toward the magnetic detection unit along the axial direction of the rotor such that the axial end surface of the magnet is closer to the magnetic detection unit than respective end surfaces of the magnetic pole portions are.

3. The motor according to claim 1, wherein the holding member holds the magnetic detection unit such that the first magnetosensitive portion and the second magnetosensitive portion of the magnet detection unit are arranged side by side in a direction orthogonal to the diametrical direction of the magnet.

4. The motor according to claim 1, wherein the magnetic detection unit is adjusted such that the first magnetosensitive portion of the magnet detection unit is opposed to a boundary between an S pole and an N pole of the magnet, and the second magnetosensitive portion of the magnet detection unit is opposed to a center of the N pole of the magnet.

5. The motor according to claim 1, wherein the holding member comprises a sensor mounting portion holding the magnetic detection unit, and wherein a longitudinal length of the sensor mounting portion is larger than a longitudinal length of the magnetic detection unit by a fitting tolerance, and a transverse length of the sensor mounting portion is larger than a transverse length of the magnetic detection unit by more than the fitting tolerance.

6. The motor according to claim 1, wherein the holding member comprises a sensor mounting portion and the magnetic detection unit comprises a chip, the chip comprising the first magnetosensitive portion and the second magnetosensitive portion, and wherein a longitudinal length of the sensor mounting portion is larger than a longitudinal length of the chip by a fitting tolerance, and a transverse length of the sensor mounting portion is larger than a transverse length of the chip by more than the fitting tolerance.

7. The motor according to claim 1, wherein the holding member holds the magnetic detection unit such that the magnetic detection unit is adjustable in the diametrical direction of the magnet to account for a position error between a spacing between the first and second magnetosensitive portions and the magnet.

8. The motor according to claim 1, wherein the holding member holds the magnetic detection unit such that the magnetic detection unit is adjustable from a first position in which a phase difference between the first magnetosensitive portion and the second magnetosensitive portion is not equal to an electrical angle of 90 degrees to a second position in which the phase difference between the first magnetosensitive portion and the second magnetosensitive portion is equal to the electrical angle of 90 degrees.

* * * * *